H. W. VAN ALLEN.
RADIOSENSITIVE ELEMENT.
APPLICATION FILED APR. 12, 1921.

1,431,271.

Patented Oct. 10, 1922.

INVENTOR
Harvey W. Van Allen.
BY Chapin & Neal
ATTORNEYS

Patented Oct. 10, 1922.

UNITED STATES PATENT OFFICE.

HARVEY W. VAN ALLEN, OF SPRINGFIELD, MASSACHUSETTS.

RADIOSENSITIVE ELEMENT.

Application filed April 12, 1921. Serial No. 460,669.

*To all whom it may concern:*

Be it known that I, HARVEY W. VAN ALLEN, a citizen of the United States, residing at Springfield, in the county of Hampden and State of Massachusetts, have invented new and useful Improvements in Radiosensitive Elements, of which the following is a specification.

This invention relates to improved means for taking X-ray photographs or radiographs, and more particularly to the arrangement of the photographic film or plate adapted to record the radiograph, although the invention is applicable to any radio-sensitive element adapted to render visible an image or shadow from the action of X-rays.

It has been the practice heretofore, in taking radiographs by the use of X-rays, to use as radio-sensitive elements, either flat sensitized glass plates or normally flat flexible films.

Since the usual X-ray tube projects its rays from a target or focal point in a cone of ever widening rays, flat radio-sensitive elements are not adapted to record thereon the accurate shadows of the objects placed between them and the focal point of the X-rays. The shadows thus cast upon a flat film or plate are both distorted and vary in density, due to the spreading effect of the rays. Variation in the intensive effect of rays is due to the flat surface of the film not being at all points equidistant from the focal source of the rays, that is to say, the portion of the surface directly in the axis of the rays receives the shortest or normal rays in a perpendicular direction, while other portions of the flat surface receive rays of longer length and at various angles, depending upon the distance thereof from the perpendicular rays. The intensive effect of the rays upon the sensitive element or film varies inversely with their length, and the spreading disposition of the rays causes a distorted shadow to be projected upon the flat sensitive plate or film.

An object of the present invention is to arrange the film or plate in relation to the focal point of the X-rays so as to avoid in large part this distortion and variation of intensity in the shadow or image cast upon the photographic plate or film.

The ideal relationship between the focal point of the rays and sensitized film or plate to receive a radiograph free from any of the above-mentioned faults, would be one in which the film or plate had a spherically-curved surface with its center of curvature coinciding with that of the focal point of the rays. In such a case, all rays striking the film or plate would be of equal length and intensive effect, and also normal to the surface of the film or plate so as to project substantially a true shadow thereon.

I have found, however, that for practical purposes a film or plate, presenting a concave and substantially cylindrical surface to the focal point of the rays, obviates many of the disadvantages incident to the use of flat plates or films, and that radiographs obtained by such a cylindrical surface are sufficiently accurate for ordinary purposes and are a great improvement over radiographs obtained on a flat plate or film. Moreover, the cylindrical disposition of the sensitized film is much easier to obtain with the flexible films now in common use than would be a spherical disposition of such a film. For the latter, specially-constructed films or plates would have to be made.

The means at present preferred for accomplishing the objects of the invention are set forth in the following description and accompanying drawings, in which.

Figure 1:
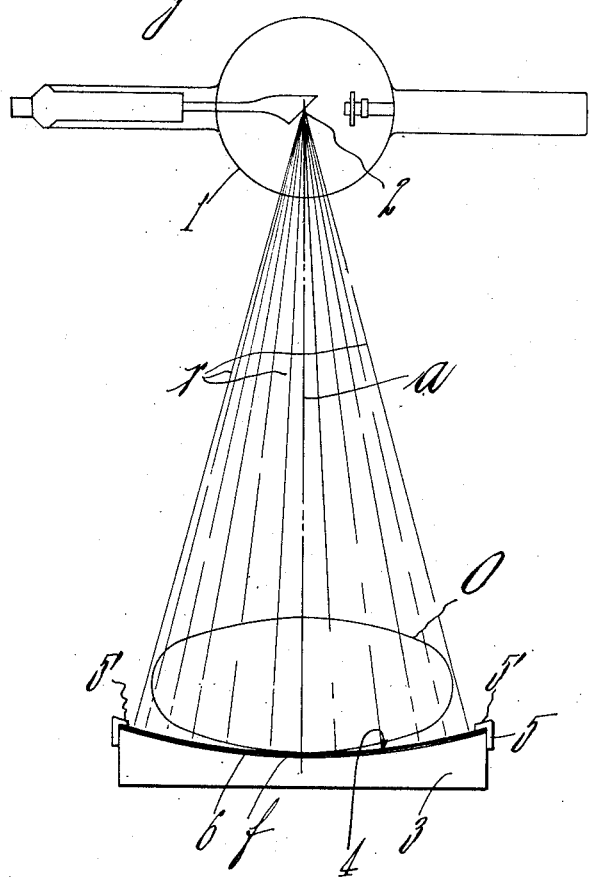
Fig. 1 is a diagrammatic view of an X-ray tube and radio-sensitive element.
Figure 3:
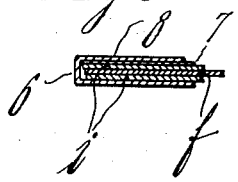
Fig. 3 is an enlarged sectional view taken on the line 4—4 of Fig. 2.
Figure 2:
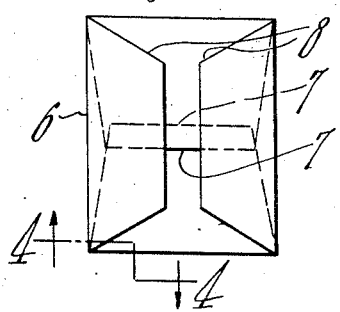
Fig. 2 is a small-size view of a holder or book for holding the element.

In the drawing, 1 represents an X-ray tube of the usual and well-known type, having a focal point or target 2 from which the X-rays $r$ are projected radially in the usual conical disposition. The tube 1 may be adjustably supported in a suitable support (not shown) in the usual manner, whereby it may be raised, lowered or otherwise adjusted with respect to the object O to be radiographed or with respect to the curved radio-sensitive elements $f$ as will later appear.

Any suitable support, such as 3, having a curved concave surface 4 is provided and has at opposite edges angular strips 5 the short legs 5' of which are spaced away from the surface 4 of the support 3 and are adapted to engage thereunder the longitudinal edges of a suitable radio-sensitive element-holder such as 6. The surface 4 is preferably curved to support and hold the radio-sensitive element $f$ in such a manner that the radius of its curvature may be substantially equal to the shortest distance $a$ between it and the focal point 2 of the X-ray tube 1. The radius of curvature of the surface 4 may be varied, according to the height or distance at which it is desired to adjust the focal point 2 of the tube with respect to the radio-sensitive element. The support 3 herein shown is adapted to support a radio-sensitive element in cylindrical form, but it is obvious that if desired a support may be provided for an element in spherical form.

The radio-sensitive element $f$ employed is preferably a flexible film sensitized in the usual and well-known manner for photo-chemical action, and for use is preferably enclosed in a light-tight flexible book or holder 6 provided with overlapping flaps 7 and 8. Any other form of holder may be employed for enclosing the film $f$ if desired, the particular form herein shown being merely descriptive of one manner of practicing the invention. Intensifying elements that are usually flexible and of a composition to hasten the photo-chemical action of the X-ray, may be placed adjacent the film $f$, if desired. They are, however, no part of this invention and are herein shown merely for descriptive purposes.

Both the holder 6 and the film being flexible, they accommodate themselves to the curvature of the support, so that the film presents a concave curve surface to the focal point when in use. Curved glass plates enclosed in light-tight devices, may also be employed, if desired, for the radiographing process.

In operation, the holder 6 enclosing the radio-sensitive film $f$ is placed upon the surface 4 of the support 3. An object O to be radiographed, such as the body of a person, is placed above the holder 6. The tube 1 may be adjusted to bring the focal point 2 a proper distance from the film $f$, in which position the axis of curvature of the cylindrically-dispose film will substantially coincide with said focal point and extend substantially at right angles to the axis $a$ of the conically-dispersed rays.

The X-rays are projected radially from the focal point or target 2 of the tube 1 toward the object O and radio-sensitive film $f$, and photo-chemically record upon the said element the shadows of the various parts of the object, according to the relative density and location thereof.

Having described my invention in the embodiment at present preferred, I do not wish to limit myself to the exact form shown, as it is obvious that many changes may be made without departing from the scope of the invention as claimed.

What I claim is:

1. The combination with an X-ray apparatus having means to project X-rays from a focal point, of a radio-sensitive element presenting a concave surface to the rays emitted from said focal point, said surface being substantially cylindrical in curvature with a radius substantially equal to the shortest distance from said surface to said focal point.

2. The combination with an X-ray apparatus having means to project X-rays from a focal point, of a radio-sensitive element presenting a curved concave surface to the rays emitted from the said focal point and having its axis of curvature in substantial coincidence with the focal point of said rays.

3. The combination with an X-ray apparatus having means to project X-rays from a focal point, of a radio-sensitive element presenting a curved concave surface to the rays emitted from the said focal point, said concave surface having a radius of curvature substantially equal to the shortest distance from said focal point to said radio-sensitive element.

4. The combination with an X-ray apparatus having means to project X-rays from a focal point, of a radio-sensitive element presenting a concave cylindrical surface to said rays, the axis of curvature of said surface being substantially coincident with said focal point and substantially at right angles to the axis of the rays emitted from said focal point.

In testimony whereof I have affixed my signature.

HARVEY W. VAN ALLEN.